United States Patent
Büssert et al.

(10) Patent No.: US 7,107,523 B2
(45) Date of Patent: Sep. 12, 2006

(54) PROVISION OF PROJECT AND/OR PROJECT PLANNING DATA OF AN AUTOMATION PROJECT IN A FORMAT WHICH IS DEFINED BY A STANDARDIZED META LANGUAGE, IN PARTICULAR XML

(75) Inventors: Jürgen Büssert, Igensdorf (DE); Peter Wagner, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 573 days.

(21) Appl. No.: 10/056,894

(22) Filed: Nov. 13, 2001

(65) Prior Publication Data

US 2003/0014440 A1 Jan. 16, 2003

(30) Foreign Application Priority Data

| Dec. 15, 2000 | (DE) | 100 62 741 |
| Dec. 18, 2000 | (DE) | 100 63 059 |
| Dec. 21, 2000 | (DE) | 100 64 400 |
| May 23, 2001 | (DE) | 101 25 383 |
| May 23, 2001 | (DE) | 101 25 386 |
| Aug. 6, 2001 | (DE) | 101 38 533 |

(51) Int. Cl.
*G06F 3/00* (2006.01)
(52) U.S. Cl. .................................... 715/513
(58) Field of Classification Search ................ 715/513, 715/517, 523, 530
See application file for complete search history.

(56) References Cited

U.S. PATENT DOCUMENTS

| 5,173,853 | A | * | 12/1992 | Kelly et al. ................. 715/530 |
| 5,504,891 | A | * | 4/1996 | Motoyama et al. ......... 715/513 |
| 5,826,062 | A | * | 10/1998 | Fake et al. .................. 715/513 |
| 5,848,386 | A | * | 12/1998 | Motoyama .................... 704/5 |
| 5,930,512 | A |   | 7/1999 | Boden et al. ............... 717/102 |
| 5,970,490 | A |   | 10/1999 | Morgenstern ................ 707/10 |
| 6,085,199 | A | * | 7/2000 | Rose ....................... 707/104.1 |
| 6,119,137 | A | * | 9/2000 | Smith et al. ................ 715/523 |
| 6,157,924 | A | * | 12/2000 | Austin ........................ 707/10 |
| 6,336,124 | B1 | * | 1/2002 | Alam et al. ................ 715/523 |

(Continued)

OTHER PUBLICATIONS

"Release Jun. 12, 1992," <http://betaprograms.autodesk.com/history/general_4545_r12_history.htm>, pp. 1-5.*

(Continued)

*Primary Examiner*—Stephen Hong
*Assistant Examiner*—Kyle R. Stork
(74) *Attorney, Agent, or Firm*—Baker Botts L.L.P.

(57) ABSTRACT

The invention relates to a device, an engineering system and method for providing project data and/or project planning data of an automation project or of a component in a format which is defined by a standardized meta language, in particular XML. By converting project data and/or project planning data with a proprietary format into data with a format which is defined by a standardized meta language, in particular XML, and by providing this data with a defined format, external computer program products or tools which map onto data with the defined format can read-in, analyze, display and/or process this data without having to convert the project data and/or project planning data into a format which the respective computer program product or tool can read or process. By converting data with a defined format into data with a proprietary format, it is possible to make available data generated by external computer program products or tools to the automation project. As a result, the generation and modification of control programs can be considerably simplified and speeded up.

4 Claims, 2 Drawing Sheets

U.S. PATENT DOCUMENTS 6,490,603 B1 * 12/2002 Keenan et al. ............... 715/513
6,732,191 B1 * 5/2004 Baker et al. .................... 710/1
2002/0002566 A1 * 1/2002 Gajraj ........................ 707/513

OTHER PUBLICATIONS

"IPNet Solutions Announces XML Products," Apr. 21, 1999, <http://xml.coverpages.org/ipnet19990413.html>, pp. 1-2.*

Heery, "Review of Metadata Formats," Oct. 1996, <http://ukoln.ac.uk/metadata/review.html>, pp. 1-24.*

"NPS Metadata Tools," <http://www.nature.nps.gov/im/units/mwr/gis/metadata/help/metadata_formats.htm>, pp. 1-2.*

*A Flexible Web-Based PDM Approach to Support Virtual Engineering Cooperation*, by M. Abramovici et al., 33rd Hawaii International Conference on System Sciences, vol. 6, Jan. 4-7, 2000, pp. 1-10.

Bert Bros, XML in 10 Points, 1999; [http://www.w3.org/XML-in-10-points] (In www.archive.org am Nov. 15, 1999) 4 Pages.

European Search Report; GR 2000P23311EP; pp. 3.

J. Suzuki et al.; "Toward the Interoperable Software Design Models: Quartet of UML, XML, DOM and COBRA", Proceedings IEEE International Software Engineering Standards Symposium; pp. 163-172.

B. Klein; "Application Development XML Makes Object Models More Useful"; Informationweek; Manhasset, NY, US; pp. 1A-6A.

C. Nentwich et al.; "BOX: Browsing Objects in XML"; Software Practice & Experience, Wiley & Sons, Bognor Regis, GB; vol. 30, No. 15; pp. 1661-1676.

S. Brodsky; "XMI Opens Application Interchange"; IBM; pp. 1-12.

D.A. Hess; "Rational Rose Enterprise Edition", Enterprise Business; pp. 1-3.

* cited by examiner

PROVISION OF PROJECT AND/OR PROJECT PLANNING DATA OF AN AUTOMATION PROJECT IN A FORMAT WHICH IS DEFINED BY A STANDARDIZED META LANGUAGE, IN PARTICULAR XML

FIELD OF THE INVENTION

The invention relates to a device for providing project and/or project planning data of an automation project in a format which is defined by a standardized meta language, in particular XML. Furthermore, the present invention relates to a corresponding engineering system and corresponding method for providing project data and/or project planning data.

BACKGROUND OF THE INVENTION

Programmable control systems generally contain what is referred to as a run-time system for controlling the sequencing over time of automation components, including a machine or a system, and what is referred to as an engineering system for editing, generating and/or modifying control programs. The project data and/or project planning data which is generated in and with the engineering system, including a proprietary format, is transferred into the run-time system and used there for outputting the control variables.

As the complexity of programmable control systems and of automation components increases and as the complexity of the objectives to be fulfilled by these systems and components increases, the control programs required are also becoming more and more complex. One possible method of countering these increasing complexities would be to increase further the functionality of the previous engineering systems. However, this has the disadvantage that the engineering systems themselves become more and more complex and thus more costly in terms of their programming and further development.

SUMMARY OF THE INVENTION

The object of the present invention is therefore to facilitate and improve the development of control programs without the aforesaid disadvantages. According to the invention, this object is achieved by means of a device for providing project data and/or project planning data of an automation project which contains a converting apparatus for converting project data and/or project planning data having a proprietary format into data with a format which is defined by a standardized meta language, in particular XML, and for converting said defined format into project data and/or project planning data into the proprietary format for further processing. This object is further achieved by means of a corresponding engineering system and corresponding methods.

In a preferred embodiment of the present invention, project data and/or project planning data of an automation project having a proprietary format is converted into data with a format which is defined by a standardized meta language, in particular XML. Data in the defined format is provided to an external computer program products or tools which map onto this data, and which can read-in, analyze, display and/or process this data without the data having to be converted, for each computer program product or tool, into a format which can be read and/or processed by the computer program product or tool. By converting data with a defined format into data with a proprietary format, data generated by external computer program products or tools can be made available to the automation project. The generation and modification of control programs can be considerably simplified and speeded up by means of the present invention.

The term "meta language" means a language. More specifically, the meta language describes the rules for generating a language. The "Standard Generalized Markup Language" (SGML), for example, is referred to as a meta language because it constitutes a language for describing languages. It defines the rules defining how a document can be written in its logical structure (headings, paragraphs, content units etc). XML (extensible markup language) is a subset of SGML, and therefore a meta language for defining document types. With a meta language, such as SGML or XML, it is possible to produce documents which all follow the same basic patterns in terms of their structure. For the sake of simplicity, the present invention is described below solely with reference to XML.

A significant advantage of XML is that a strict distinction is made between the content, representation and structure of data. This is achieved by means of the possibility of defining tags in XML files, which tags can in turn contain other tags. As a result, an XML file can set up a tree which leads to a structured distinction between different contents. This ensures the basis for machine processing of the file.

An XML document can assume different representations using different XSL files (XSL=extensible stylesheet language). XSLT (XSLT=extensible stylesheet language for transformations) is used for converting from one XML document into another. Application areas for XSLT may be the conversion of XML files into HTML (hypertext markup language) or XHTML (extensible hypertext markup language), but also into free formats.

The device in accordance with the invention preferably has an export/import apparatus for exporting/importing data from and into the device. In this way, direct exporting/importing of the data into and from the external software product, products, or tools is possible. This feature further simplifies the handling of the data.

According to another preferred embodiment of the device according to the present invention, a data storage apparatus is provided for storing data with a defined format. If the data with a defined format is stored in a data storage apparatus, the project data and/or project planning data do not need to be converted again into data with a defined format for each exporting process. The data storage apparatus can thus be used to make available the data with the format defined by the standardized meta language for an external software program product or tool without appreciable time delay.

Examples of software program products or tools which can image data in a format which is defined by a standardized meta language, in particular XML, are:
Version administration programs such as can be obtained under the trade names "ClearCase" or "PVCS";
CAD, CAM, CAE programs (CAD=computer aided design, CAM=computer aided manufacturing, CAE=computer aided engineering);
Cam disk programs;
Productivity tools which can generate parts of project data and/or project planning data; and
Project design tools (Sizer), for supporting the generation or duplication of project data and/or project planning data.

The project data and/or project planning data can be exported, as data with a defined format, from the automation project and read into the software program products or tools by means of the export/import apparatus of the device and/or the engineering system according to the invention. The software program products or tools can then analyze, evaluate, display and/or process this data. It is possible to provide only those elements which are known to the reading-in software program product or the tool to be analyzed, evaluated, displayed and/or processed by the software program product. Unknown parts are ignored by the software program product or tool in this case. If data is absent in the structure, it can be filled with standard initial values. Contents of a data record which have remained the same can also be transferred by means of different data structure versions using the data which can be generated using the standardized meta languages, in particular XML, which has a strictly hierarchical structure.

The software program products or tools which can process the project data and/or project planning data with a defined format, i.e., cam disk programs, project design programs, and productivity tools, can transmit back the changed or modified data with a defined format to the automation project, in particular by means of the export/import apparatus, after the processing of the data with a defined format. During importing, the data with the defined format is converted into data with a proprietary format using the conversion apparatus. This data can then be transmitted, possibly after further processing, by the automation project or the engineering system in a form which is suitable for the run-time system.

For practical reasons, it is preferred for the conversion apparatus and the export/import apparatus to be embodied as one apparatus. In this case, the export/import apparatus would simultaneously have the functionality of the conversion apparatus or the conversion apparatus, would simultaneously be capable of exporting data from the automation project or importing it into it.

Thus, the present invention makes it possible to convert project and/or project planning data which is present in an automation project in a proprietary format into data with a format which is defined by a standardized meta language, in particular XML; and to export it from an automation project, or import it into software program products or tools, process it there, transmit back the processed data with a defined format to the automation project, and convert it into data with a proprietary format, and thus make it available to the automation project or engineering system as project data and/or project planning data.

In a further embodiment of the method according to the present invention, project data and/or project planning data of an automation project or of a component can be generated by virtue of the fact that at least one computer program product or tool generates project data and/or project planning data, or is generated thereby, and this data is provided in a format defined by means of a standardized meta language for further processing. The data with a defined format can then be imported into an automation project and converted into a proprietary data format there. In this way, a complete record of project data and/or project planning data for an automation project can also be produced there using external computer program products or tools. For this purpose, the data required for this is generated by the at least one external computer program product or tool as data with a defined format, or converted into such data, and subsequently made available for further processing. After or during the importing of data with a defined format into the automation project, the data is then converted into data with a proprietary format.

Changes or improvements to the record of project data and/or project planning data generated in this way can then be attempted and/or carried out by means of at least one application of the method according to the invention or by means of at least one varying repetition of the second method according to the invention. The method(s) according to the invention can be applied repeatedly until an optimum record of project data and/or project planning data has been generated or found for the given automation project.

A further advantage of the present invention is that, on the basis of the mechanisms described, for example changes of project data and/or project planning data by comparison with project data and/or project planning data which has been produced earlier or later, it is possible to detect and evaluate very easily whether this data is respectively present with a format which is defined by a standardized meta language. Using data which is structured in this way, it is possible to process differences between various versions of project data and/or project planning data with very high resolution. This is particularly advantageous for methods and processes the sequence of which must be precisely defined and capable of being followed. Thus, the present invention can more easily take into account, for example, the regulations of the US Food and Drug Administration (FDA) and the "Change Control" regulations prescribed by the FDA.

A further advantage of providing project data and/or project planning data in, for example XML format, is that the data can be converted into files with practically any desired format using XSLT. It is thus possible, for example, to convert at least some of the data from an XML file into an HTML document by means of XSLT instructions. Such an HTML document can then be viewed with one of the known browsers. To do this, the HTML document can also be loaded and represented by means of an external computer via the Internet. In addition to the display of at least some of the project data and/or project planning data by means of conversion into HTML files, it is possible to use XSLT also to generate files in any desired format from the data with XML format. Such files can then be read-in and/or processed by a software program product, and used to generate documentation for an automation project. The documentation of the respectively executed changes in an automation project is also made easier by means of the present invention.

The present invention thus makes it possible to use a multiplicity of external software program products or tools for the development and supervision of control programs in which respective functionalities do not need to be integrated into the engineering system. The possibility of the use and the integration of external software program products or tools for the development and supervision of control programs makes it possible, on the one hand, to avoid a situation in which the engineering system is "overloaded" with functionalities, and on the other hand it is possible to re-use the software program products or tools which respectively appear the most suitable for each automation project.

BRIEF DESCRIPTION OF THE DRAWINGS

The present invention is explained in greater detail below with reference to the drawings, in which.

DETAILED DESCRIPTION OF THE INVENTION

Figure 1:
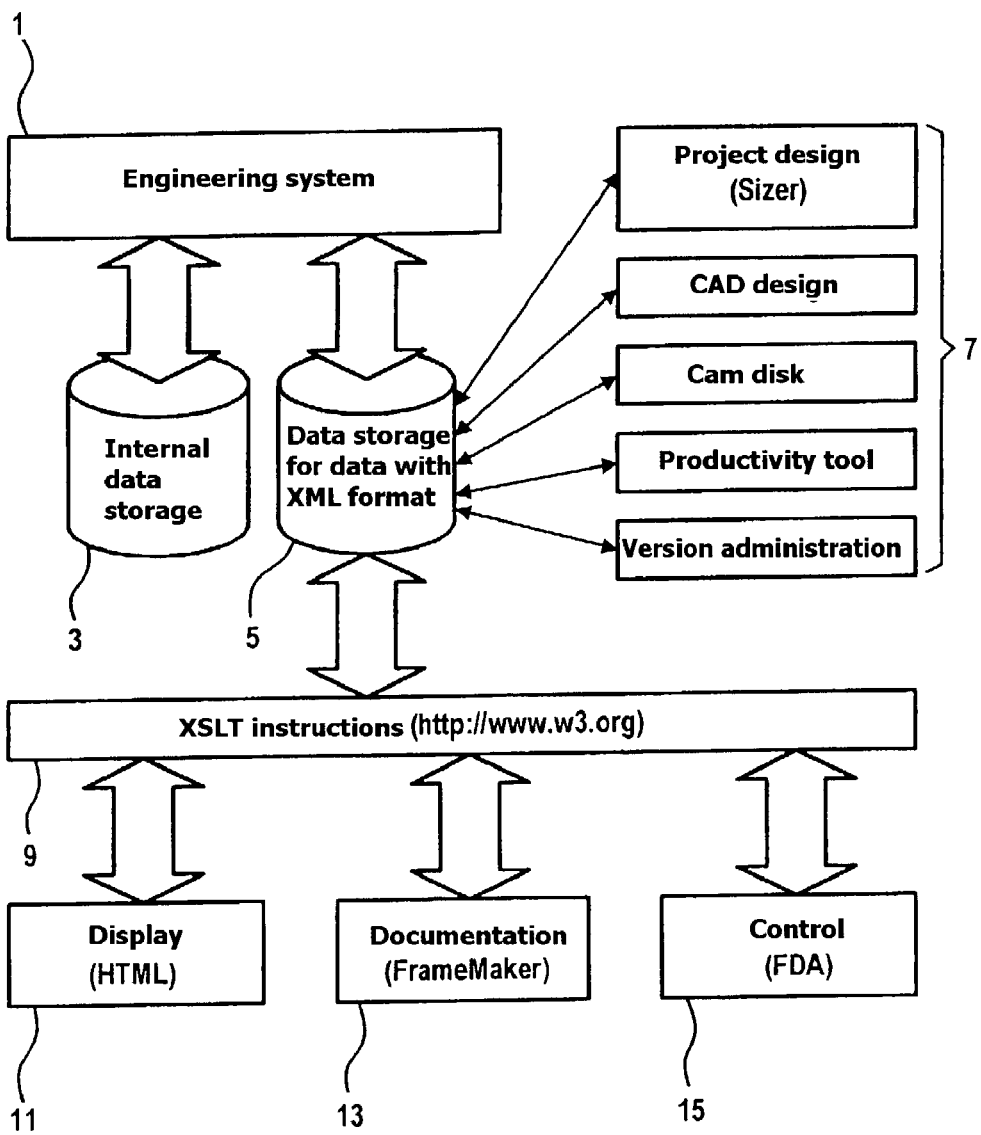
FIG. 1 illustrates a diagram illustrating the invention.

FIG. 1 illustrates a schematic view of the invention for providing project data and/or project planning data of an engineering system in the XML format. Project data and/or project planning data for the open-loop or closed-loop control of a programmable control system is generated in an engineering system 1. This data, which is present in a proprietary data format, is stored in an internal data storage means 3.

The engineering system also contains a conversion and export/import apparatus (not shown). For practical reasons the functions of both apparatuses may be implemented in a single apparatus. During exporting, data with a proprietary format is converted into data with an XML format; and during importing, the data with XML format may be converted into data with a proprietary format. The data with XML format is stored in a data storage means 5.

The data with XML format can then be read-in, evaluated and processed by software program products or tools 7 which map onto XML. Using suitable software program products or tools, new data or changed data with XML format can thus also be generated. This data, for example a machine image, can then be converted into data with a proprietary format and read back into the engineering system and used there for the development or improvement of a control program.

In FIG. 1, the data which can be processed is written back into the data storage means for the data with XML format by the software program products or tools, and/or read-in from the data storage means by the engineering system. However, other solutions in which the importing/exporting of the data is carried out in some other way, and/or by means of other apparatuses, are, of course, also conceivable within the scope of the present invention.

Using XSLT instructions 9, it is also possible to convert the data with XML format into files with virtually any desired format. These files, which can then have HTML format, or a proprietary format, can then be used in display 11, for example, using a browser to generate technical documentation 13, or generate documentation for recording and supervisory purposes 15.

The separation between the software program products or tools 7 and the displays 11 or documentation 11 and 13 is only an illustration. It is conceivable for the conversion of the XML files by means of XSLT also to be performed by at least one of the software program products or tools, and also for the display 11 and/or the production of the documentation 13, 15 to be performed by these products or tools. Thus it is possible, for example, for a version administration program to simultaneously produce documentation 15 relating to the changes which have taken place in an automation project.

Figure 2:
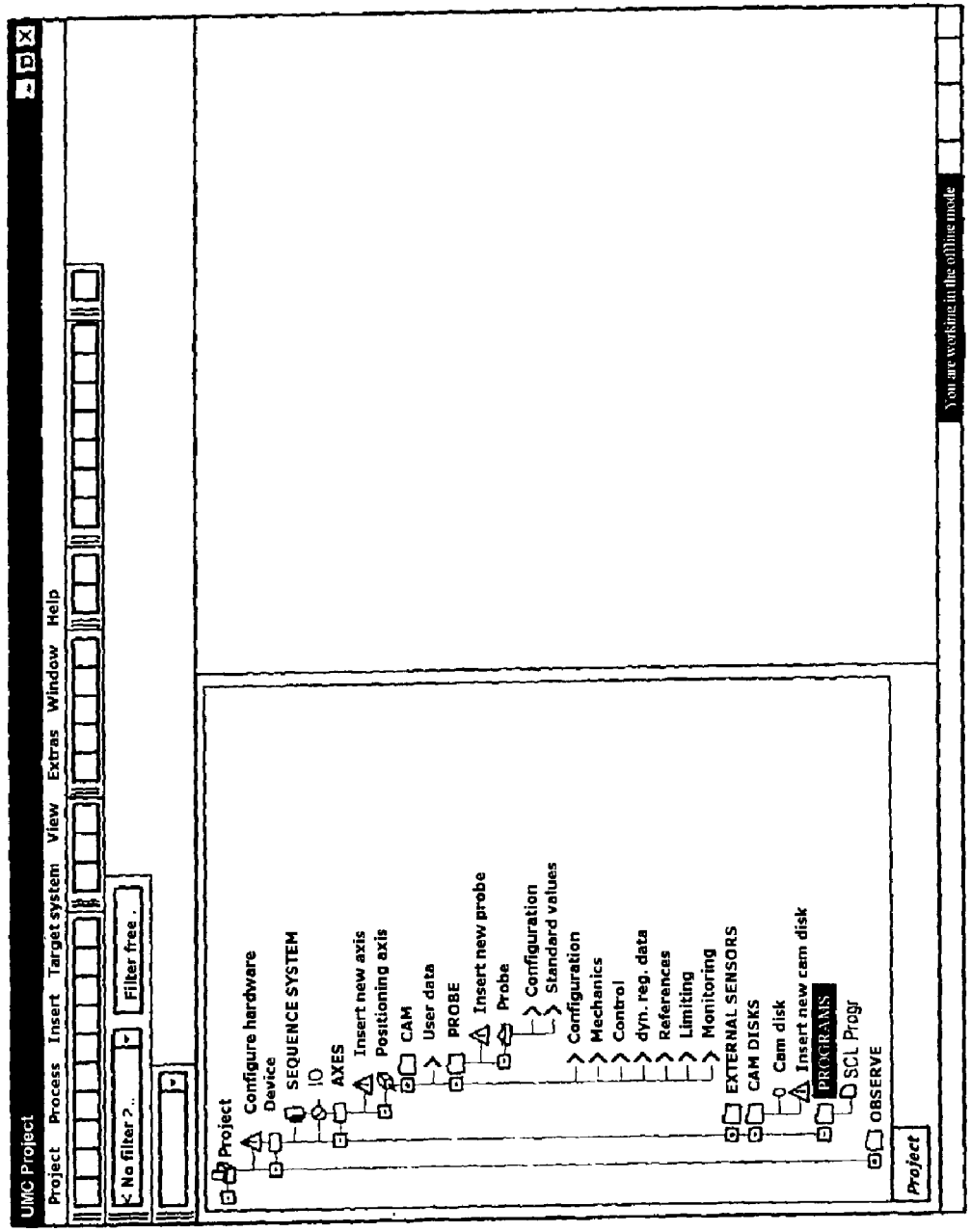
FIG. 2 illustrates a view of the file structure of the exported data with a format defined here by XML.

FIG. 2 illustrates a view of the file structure of the exported data such as is generated in the SIMOTION SCOUT system generated by the applicant. An exported SIMOTION SCOUT automation project is stored in a file structure. This structure is based on the design of an automation project in the SIMOTION SCOUT project navigator.

The large set of data of an automation project is stored in the divided-up data blocks. This permits manageable data, which still appears logical to the user after exporting. Another aspect of such a hierarchy is the possibility of analyzing components of an automation project or transmitting them over the Internet without disrupting the unimportant data.

The hierarchy of the data with XML format such as is generated in the case of SIMOTION SCOUT is explained below as a possible example of the hierarchy of the data with XML format:

| Folder: | MyProjectDataFolder |
| --- | --- |
| | Project.xml |
| Folder: | Project |
| | Project.xml |
| | Alarms.xml |
| | Installation.xml |
| | ReferenceTable.xml |
| | S7ProjectData.xml |
| Folder: | Device |
| | Device.xml |
| | RunTimeLevels.xml |
| | DeviceData.xml |
| | Device_Symbols.xml |
| Folder: | ProcessingUnit |
| | ProcessingUnit.xml |
| | SCL-Programm.xml |
| Folder: | TOCamType |
| | TOCamType.xml |
| | Camdisk.xml |
| Folder: | TOPosAxis |
| | TOPosAxis.xml |
| Folder: | PositioningAxis |
| | PositioningAxis.xml |
| | ExpertList.xml |

Different XML files are created in the hierarchy. Files can exclusively contain links or exclusively contain data. The files which contain links are located in a folder of the same name and the files which make it possible to enter this folder. The links which are contained in the files refer to XML files which are responsible for the data storage and are located in the same folder. In addition, the links can also refer to the entry files of the subfolders. This principle simplifies portability. This ensures that a folder can removed from the hierarchy without the structure being lost. In this way, relevant data can be passed onto third parties without also supplying unnecessary files.

We claim:

1. A device for converting automation project data in a proprietary automation project data format to a format defined by a standardized meta format, said device comprising:

a conversion apparatus for converting the automation project data into a defined standardized meta data format having a hierarchy of data comprising a plurality of folders wherein at least one of the plurality of folders containing exclusively links and at least one of the plurality of the plurality of folders contains exclusively data;

means for providing the automation project data in the defined standardized meta data format for further processing; and an export/import apparatus for importing and exporting the automation project data in different formats.

2. A device according to claim 1, further comprising a data storage apparatus for storing the automation project data in a defined format.

3. An engineering system comprising the device according to claim 1.

4. A device according to claim 1 wherein the standardized meta format comprises XML.

* * * * *